United States Patent
Slaczka et al.

(10) Patent No.: US 11,167,490 B2
(45) Date of Patent: Nov. 9, 2021

(54) MULTI-MATERIAL SEPARATION LAYERS FOR ADDITIVE FABRICATION

(71) Applicant: Formlabs, Inc., Somerville, MA (US)

(72) Inventors: Marcin Slaczka, Boston, MA (US); Benjamin FrantzDale, Harvard, MA (US); Ian Ferguson, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 646 days.

(21) Appl. No.: 15/807,404

(22) Filed: Nov. 8, 2017

(65) Prior Publication Data

US 2018/0126644 A1     May 10, 2018

Related U.S. Application Data

(60) Provisional application No. 62/419,375, filed on Nov. 8, 2016.

(51) Int. Cl.

| | | |
|---|---|---|
| *B29C 64/255* | (2017.01) | |
| *B29C 64/135* | (2017.01) | |
| *B32B 25/08* | (2006.01) | |
| *B32B 25/20* | (2006.01) | |
| *B33Y 30/00* | (2015.01) | |

(52) U.S. Cl.
CPC .......... *B29C 64/255* (2017.08); *B29C 64/135* (2017.08); *B32B 25/08* (2013.01); *B32B 25/20* (2013.01); *B29K 2823/18* (2013.01); *B29K 2883/00* (2013.01); *B29K 2995/0067* (2013.01); *B32B 2307/7244* (2013.01); *B32B 2439/02* (2013.01); *B33Y 30/00* (2014.12)

(58) Field of Classification Search
CPC ... B29C 64/255; B29C 64/124; B29C 64/129; B29C 64/135; B29C 64/245
See application file for complete search history.

(56) References Cited

U.S. PATENT DOCUMENTS

| | | |
|---|---|---|
| 2,311,613 A | 2/1943 | Slayter |
| 5,391,072 A | 2/1995 | Lawton et al. |
| (Continued) | | |

FOREIGN PATENT DOCUMENTS

| | | |
|---|---|---|
| CN | 104760291 A | 7/2015 |
| CN | 105014974 A | 11/2015 |
| (Continued) | | |

OTHER PUBLICATIONS

Adtech ("Fluoropolymers Gas Permeability").*
(Continued)

*Primary Examiner* — Galen H Hauth
*Assistant Examiner* — Asha A Thomas
(74) *Attorney, Agent, or Firm* — Wolf, Greenfield & Sacks, P.C.

(57) ABSTRACT

According to some aspects, a container is provided for use in an additive fabrication device configured to fabricate parts by curing a liquid photopolymer to form layers of cured photopolymer. The container may comprise a laminated multi-material layer having an elastic first layer that aids in separation of cured photopolymer from the container in addition to a barrier layer on an upper surface that protects the first layer from exposure to substances in the liquid photopolymer that may not be compatible with the material of the first layer.

16 Claims, 6 Drawing Sheets

(56) References Cited

U.S. PATENT DOCUMENTS

| | | | |
|---|---|---|---|
| 5,545,367 A | 8/1996 | Bae et al. | |
| 5,549,969 A | 8/1996 | Parish | |
| 8,758,663 B2 | 6/2014 | Elsey | |
| 8,877,115 B2 | 11/2014 | Elsey | |
| 9,079,355 B2 | 7/2015 | El-Siblani et al. | |
| 9,205,601 B2 | 12/2015 | DeSimone et al. | |
| 9,375,881 B2 | 6/2016 | Elsey | |
| 9,802,361 B2 | 10/2017 | Elsey | |
| 10,150,257 B1* | 12/2018 | Joyce | B29C 64/129 |
| 10,675,856 B2 | 6/2020 | FrantzDale | |
| 2003/0165670 A1 | 9/2003 | Gerard et al. | |
| 2004/0149127 A1* | 8/2004 | Lyons | B01D 53/22 95/45 |
| 2006/0147693 A1 | 7/2006 | Przybylinski et al. | |
| 2013/0001834 A1 | 1/2013 | El-Siblani et al. | |
| 2013/0292862 A1 | 11/2013 | Joyce | |
| 2014/0030522 A1 | 1/2014 | Choiniere et al. | |
| 2015/0151489 A1 | 6/2015 | Elsey | |
| 2015/0352788 A1 | 12/2015 | Livingston et al. | |
| 2016/0046080 A1 | 2/2016 | Thomas et al. | |
| 2016/0059486 A1 | 3/2016 | DeSimone et al. | |
| 2016/0176112 A1* | 6/2016 | Liu | B65D 5/28 425/174.4 |
| 2016/0177247 A1* | 6/2016 | Clark | B32B 27/28 435/325 |
| 2016/0193786 A1* | 7/2016 | Moore | B29C 64/393 425/162 |
| 2016/0200052 A1 | 7/2016 | Moore et al. | |
| 2016/0303795 A1 | 10/2016 | Liu et al. | |
| 2017/0015063 A1 | 1/2017 | Hanyu et al. | |
| 2017/0021562 A1 | 1/2017 | El-Siblani et al. | |
| 2017/0072627 A1 | 3/2017 | Li | |
| 2017/0197363 A1 | 7/2017 | Frantzdale | |
| 2017/0246796 A1 | 8/2017 | Bauer et al. | |
| 2017/0246797 A1 | 8/2017 | Lambrecht et al. | |
| 2018/0071976 A1 | 3/2018 | Tumbleston et al. | |
| 2018/0071977 A1 | 3/2018 | Tumbleston et al. | |
| 2018/0264724 A1 | 9/2018 | Feller et al. | |
| 2018/0290380 A1 | 10/2018 | Rehrig et al. | |
| 2019/0358902 A1 | 11/2019 | Slaczka et al. | |
| 2019/0366634 A1 | 12/2019 | Frantzdale et al. | |

FOREIGN PATENT DOCUMENTS

| | | |
|---|---|---|
| CN | 105122136 A | 12/2015 |
| CN | 106003706 A | 10/2016 |
| JP | H06-246838 A | 9/1994 |
| JP | 2001-089651 A | 4/2001 |
| WO | WO 2012/174332 A1 | 12/2012 |
| WO | WO 2015-195920 A1 | 12/2015 |
| WO | WO 2016/053512 A1 | 4/2016 |
| WO | WO 2016/123499 A1 | 8/2016 |

OTHER PUBLICATIONS

Pereira,https://books.google.com/booksid=jRX8BTrdDUsC&pg=PA60&lpg=PA60&dq=oxygen+permeability+of+PMP+and+PDMS&source=bl&ots=ylJKYI35Tq&sig=ACfU3U1qSq2yGdVKDnrM44XP1Qectt_oOg&hl=en&ppis=_c&sa=X&ved=2ahUKEwj20oq4k-7mAhWSVt8KHeXzCuUQ6AEwD3oECAgQAQ#v=onepage&q=oxygen%20permeability%20of%20PMP%20and%20PDMS&f=false.*

Figoli, Jan. 2001, "Facilitated oxygen transport in liquid membranes: review and new concepts": ("https://www.sciencedirect.com/science/article/pii/S0376738800005081").*

U.S. Appl. No. 16/404,524, filed May 6, 2019, Slaczka et al..

U.S. Appl. No. 16/427,912, filed May 31, 2019, Frantzdale et al..

EP 16882428.2, dated Jul. 3, 2019, Extended European Search Report.

PCT/US2017/060679, dated May 23, 2019, International Preliminary Report on Patentability.

PCT/US2019/034807, dated Jul. 18, 2019, Invitation to Pay Additional Fees.

PCT/US19/30936, dated Jul. 29, 2019, International Search Report and Written Opinion.

International Search Report and Written Opinion for International Application No. PCT/US2016/068318 dated Feb. 28, 2017.

International Preliminary Report on Patentability for International Application No. PCT/US2016/068318 dated Jul. 12, 2018.

Little, Tunable and High Refractive Index Polydimethylsiloxane Polymers for Label-Free Optical Sensing. Thesis for degree of Master of Science. Queen's University, Kingston, Ontario Canada, Aug. 2013. 180 pages.

Extended European Search Report for Application No. EP 16882428.2 dated Jul. 3, 2019.

International Preliminary Report on Patentability for International Application No. PCT/US2017/060679 dated May 23, 2019.

Invitation to Pay Additional Fees for International Application No. PCT/US2019/034807 dated Jul. 18, 2019.

International Search Report and Written Opinion for International Application No. PCT/US19/30936.

International Search Report and Written Opinion for International Application No. PCT/US2017/060679 dated Jan. 12, 2018.

CN 201680080894.7, dated Oct. 31, 2019, Chinese communication.

PCT/US2019/034807, dated Sep. 30, 2019, International Search Report and Written Opinion.

Chinese communication for Application No. 201680080894.7 dated Oct. 31, 2019.

International Search and Written Opinion for International Application No. PCT/US2019/034807 dated Sep. 30, 2019.

Baker, Membrane Technology and Application. 2nd Edition. John Wiley & Sons, Ltd. The Atrium, Southern Gate, Chichester, West Sussex PO19 8SQ, England. 2004. 545 pages. ISBN 0-470-85445-6.

Carvalho, Wrinkling of thin sheets under tension. Thesis to obtain the Master of Science Degree in Aerospace Engineering. Nov. 2015. 103 pages.

EP17869524.3, dated Jun. 3, 2020, Extended European Search Report.

Extended European Search Report for European Application No. 17869524.3, dated Jun. 3, 2020.

International Preliminary Report on Patentability for International Application No. PCT/US2019/030936, dated Nov. 19, 2020.

International Preliminary Report on Patentability for International Application No. PCT/US2019/034807, dated Dec. 10, 2020.

* cited by examiner

MULTI-MATERIAL SEPARATION LAYERS FOR ADDITIVE FABRICATION

CROSS-REFERENCE TO RELATED APPLICATIONS

The present application claims the benefit under 35 U.S.C. § 119(e) of U.S. Provisional Patent Application No. 62/419,375, filed Nov. 8, 2016, titled "Multi-Material Separation Layers For Additive Fabrication," which is hereby incorporated by reference in its entirety.

FIELD OF INVENTION

The present invention relates generally to systems and methods for separating a part from a surface during additive fabrication (e.g., 3-dimensional printing).

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform.

SUMMARY

According to some aspects, a container is provided for use in an additive fabrication device configured to fabricate parts by curing a liquid photopolymer to form layers of cured photopolymer, the container comprising an open-topped vessel having an interior bottom surface, at least a region of the interior bottom surface being transparent to at least one wavelength of actinic radiation, and a laminated multi-material layer bonded to the interior bottom surface of the vessel and configured to facilitate separation of the cured photopolymer from an exposed surface of the laminated multi-material layer, the laminated multi-material layer comprising a first material layer bonded to at least a portion of the region of the interior bottom surface, and a second material layer bonded to at least a portion of the first material layer, the second material layer having an oxygen permeability of at least 10 Barrer and forming the exposed surface of the container.

According to some aspects, an additive fabrication device is provided configured to fabricate parts by curing a liquid photopolymer to form layers of cured photopolymer, the additive fabrication device comprising at least one source of actinic radiation configured to produce actinic radiation that includes radiation of a first wavelength, a photopolymer container, comprising an open-topped vessel having an interior bottom surface, at least a region of the interior bottom surface being transparent to the first wavelength of the actinic radiation, and a laminated multi-material layer bonded to the interior bottom surface of the vessel and configured to facilitate separation of the cured photopolymer from an exposed surface of the laminated multi-material layer, the laminated multi-material layer comprising a first material layer bonded to at least a portion of the transparent region of the interior bottom surface; and a second material layer bonded to at least a portion of the first material layer, the second material layer having an oxygen permeability of at least 10 Barrer and forming the exposed surface of the container.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. For purposes of clarity, not every component may be labeled in every drawing. In the drawings.

DETAILED DESCRIPTION

Systems and methods for separating a part from a surface during additive fabrication are provided. As discussed above, in additive fabrication a plurality of layers of material may be formed on a build platform. In some cases, one or more of the layers may be formed so as to be in contact with a surface other than another layer or the build platform. For example, stereolithographic techniques may form a layer of resin so as to be in contact with an additional surface such as a container in which liquid resin is located.

Figure 1A:
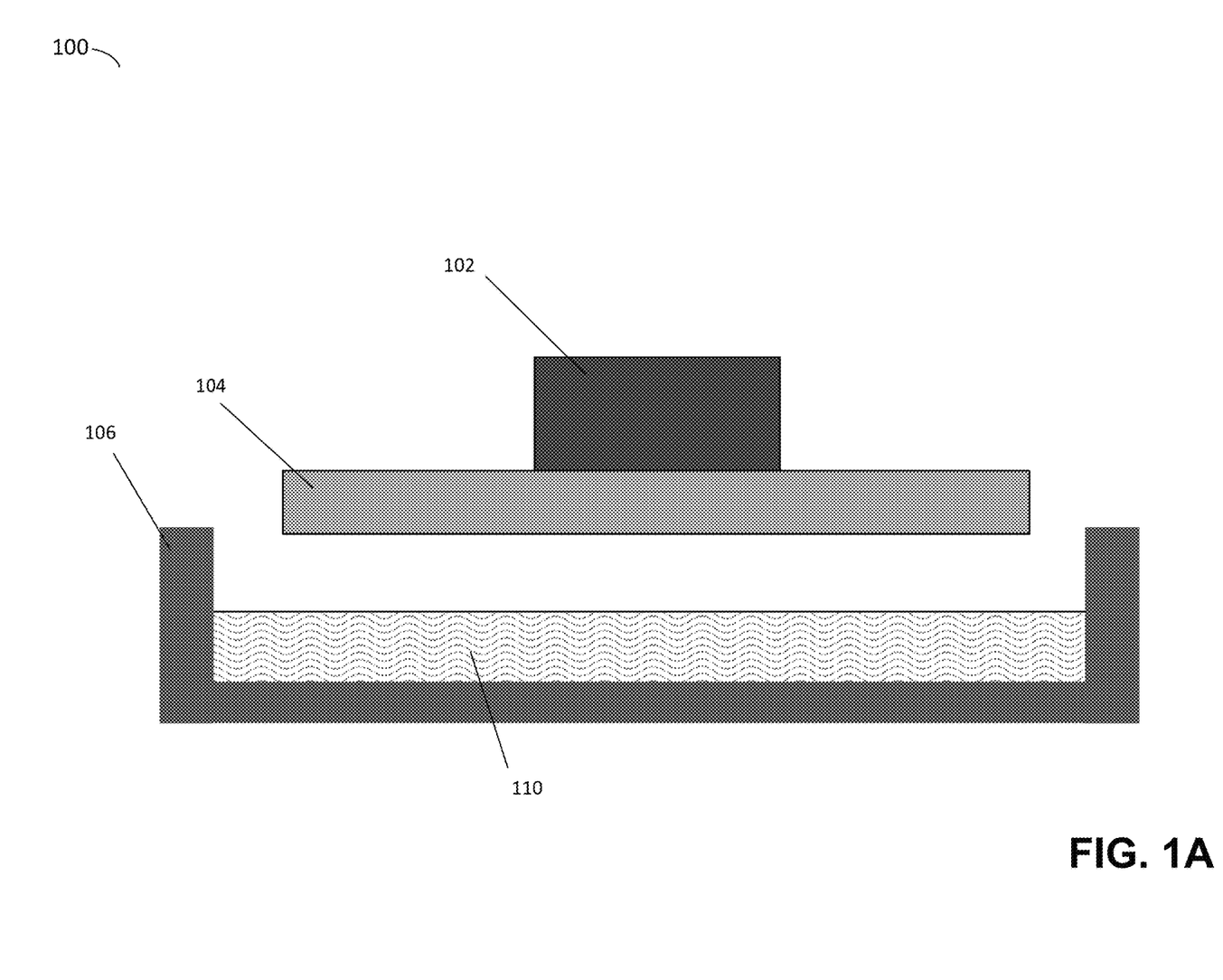
FIGS. 1A-1C illustrate a schematic view of a stereolithographic printer that forms a plurality of layers of a part, according to some embodiments.
Figure 1B:
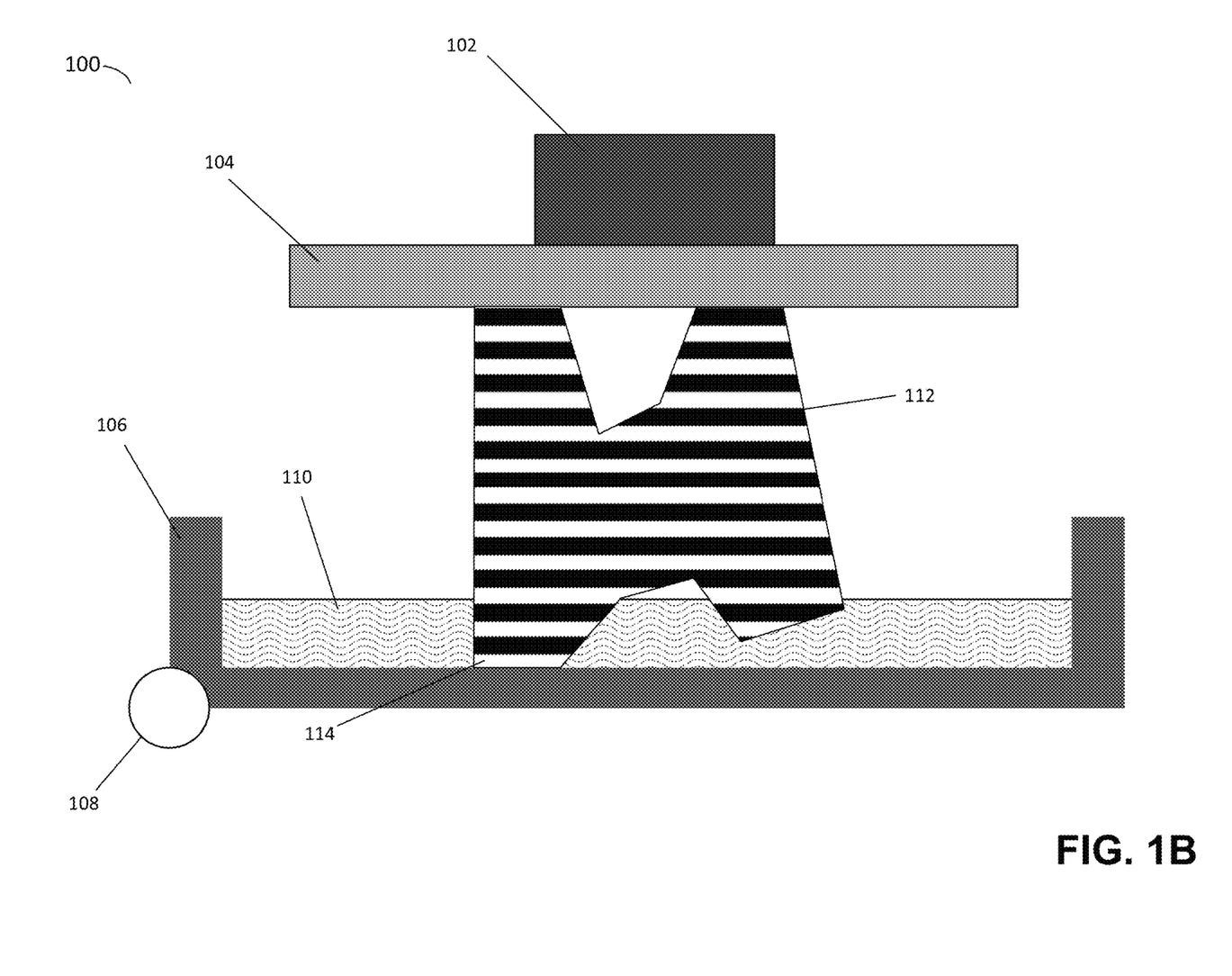
Figure 1C:
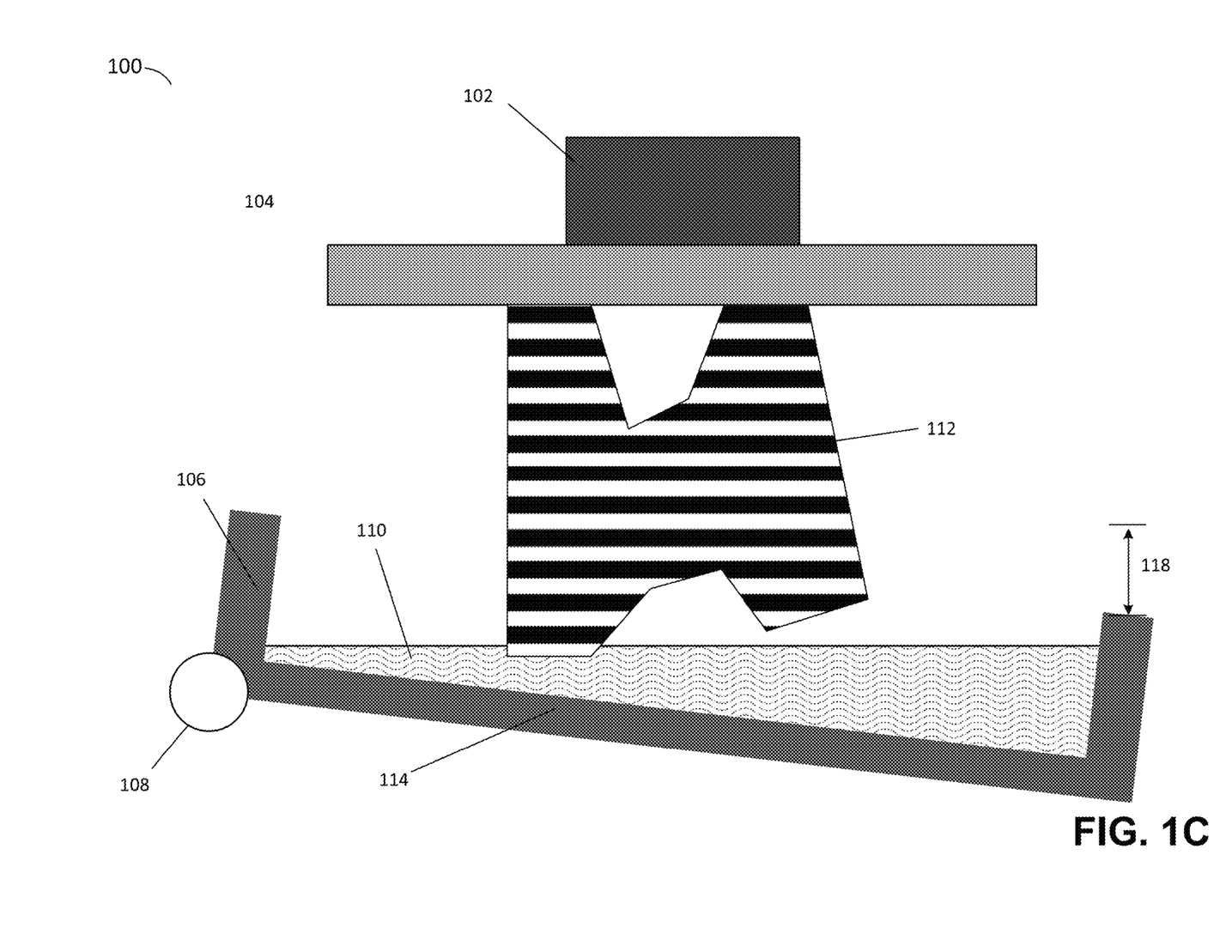

To illustrate one exemplary additive fabrication technique in which a part is formed in contact with a surface other than another layer or the build platform, an inverse stereolithographic printer is depicted in FIGS. 1A-C. Exemplary stereolithographic printer 100 forms a part in a downward facing direction on a build platform such that layers of the part are formed in contact with a surface of a container in addition to a previously cured layer or the build platform. In the example of FIGS. 1A-C, stereolithographic printer 100 comprises build platform 104, container 106, axis 108 and liquid resin 110. A downward facing build platform 104 opposes the floor of container 106, which is filled with a liquid photopolymer 110. FIG. 1A represents a configuration of stereolithographic printer 100 prior to formation of any layers of a part on build platform 104.

As shown in FIG. 1B, a part 112 may be formed layer-wise, with the initial layer attached to the build platform 104. The container's floor may be transparent to actinic radiation, which can be targeted at portions of the thin layer of liquid photocurable resin resting on the floor of the container.

Exposure to actinic radiation cures a thin layer of the liquid resin, which causes it to harden. The layer 114 is at least partially in contact with both a previously formed layer and the surface of the container 106 when it is formed. The top side of the cured resin layer typically bonds to either the bottom surface of the build platform 4 or with the previously cured resin layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

"Separation" of a part from a surface, as used herein, refers to the removal of adhesive forces connecting the part to the surface. It may therefore be appreciated that, as used herein, a part and a surface may be separated via the techniques described herein, though immediately subsequent to the separation may still be in contact with one another (e.g., at an edge and/or corner) so long as they are no longer adhered to one another.

Techniques for reducing the strength of the bond between a part and a surface may include inhibiting the curing process or providing a highly smooth surface on the inside of a container. In many use cases, however, at least some force must be applied to remove a cured resin layer from the container.

FIG. 1C depicts one illustrative approach in which a force may be applied to a part by rotating the container to mechanically separate the container from the part. In FIG. 1C, stereolithographic printer 100 separates part 112 from the container 106 by pivoting the container about a fixed axis 108 on one side of the container, thereby displacing an end of the container distal to the fixed axis a distance 118 (which may be any suitable distance). This step involves a rotation of the container 106 away from the part 112 to separate the most recently produced layer from the container, which may be followed by a rotation of the container back towards the part.

In some implementations, the build platform 104 may move away from the container to create a space for a new layer of liquid resin to form between the part and the container. The build platform may move in this fashion before, during and/or after the rotational motion of the container 106 described above. Irrespective of when the build platform moves, subsequent to the motion of the build platform a new layer of liquid resin is available for exposure and addition to the part being formed. Each step of the aforementioned curing and separating processes may continue until the part is fully created. By progressively separating the part and the container base, such as in the steps described above, the peak force and/or total force necessary to separate the part and container may be minimized.

Multiple problems may arise, however, due to the application of force during the above-described processes. In some use cases, the separation process may apply a force to and/or through the part itself. A force applied to the part may, in some use cases, cause the part to separate from the build platform, rather than the container, which may disrupt the fabrication process. In some use cases, a force applied to the part may cause deformation or mechanical failure of the part itself.

In some cases, forces applied to a part during separation processes can be reduced by applying a layer of a suitable material onto the interior bottom surface of the container. Such a layer is sometimes called a "separation layer."

Suitable materials for forming a separation layer often exhibit elastic properties and reduce the force applied to the part by its contact with the container during separation. One illustrative material commonly used in the field in this manner is polydimethylsiloxane, also known as PDMS. Several types of PDMS, such as the PDMS formulation commercially available as Sylgard 184, have been used in order to provide an actinically transparent release layer on top of a more rigid substrate, such as described in U.S. patent application Ser. No. 14/734,141. PDMS is known to provide for a substantial degree of oxygen transmission, as well as for a substantial degree of actinic transparency. PDMS also provides substantial elasticity and mechanical properties understood to be favorable for separation layers. One disadvantage of PDMS, however, lies in its tendency to undergo undesirable reactions or alterations when exposed to certain substances. In this way, PDMS is said to be incompatible with these substances.

The incompatibility of PDMS and other elastic materials with certain substances may result in various undesirable changes to a separation layer when utilized with a photopolymer containing those incompatible substances, such as degradation of the mechanical or optical properties of the elastic material. For example, certain substances, such as isobornylacrylate, have been found to cause PDMS to expand, "swell" or even separate from other materials. This behavior may render a PDMS separation layer applied to the interior of a container in a stereolithographic printer unusable. As a result, certain substances of potential interest for use in photopolymers have not been considered suitable for use in stereolithographic resin containers that include a PDMS separation layer, despite the low cost and other advantages possessed by such a separation layer.

While there are other materials that could be used to form a separation layer in a container that are compatible with the above-mentioned substances of potential interest for use in photopolymers, those materials generally do not exhibit other desirable properties for use in additive fabrication. For example, the materials may be compatible but may not have desirable mechanical properties such as elasticity when used to facilitate separation of a part from a container whilst reducing forces applied to the part. In particular, oxygen permeability is a very desirable property for a separation layer since it appears that oxygen permeability of a material inhibits curing of at least some photopolymers. The production of a thin layer of uncured resin at the surface of the container due to curing inhibition aids in separation of cured resin from the container, since the layer reduces the adhesive forces between the newly formed layer of solid resin and the container. However, generally speaking highly oxygen permeable materials are not compatible with the above-mentioned substances of potential interest for use in photopolymers, and any that may be are prohibitively expensive.

The inventors have recognized and appreciated that a separation layer formed from laminated layers of different materials can provide the above-described advantages of elastic materials like PDMS whilst being compatible with substances of potential interest for use with photopolymers that are not compatible with the elastic materials themselves. As such, a laminated multi-material separation layer may exhibit desirable mechanical properties for separation of a part from the layer and sufficient oxygen permeability to inhibit curing of resin, whilst also being compatible with a wide array of substances. In general, embodiments of the present invention may advantageously utilize two or more materials in order to form a separation layer in such a way that advantages provided by any of the two or more materials are increased or obtained, while disadvantages typically associated with any of the two or more materials are reduced or minimized. A separation layer as described herein may be attached to an existing container and/or may form part of a container.

According to some embodiments, a first material, such as PDMS, is prevented from coming in contact with a photopolymer during normal operation of an additive fabrication device by a second material placed to act as a "barrier layer" between the photopolymer and the first material. Application of such a laminated separation layer to the interior of a liquid photopolymer container may provide a combination of properties, including mechanical, optical, and chemical properties, efficiently and at potentially lower cost than other solutions. In some embodiments, one or more material layers may be combined with one or more barrier layers to form a laminated multi-material layer, that forms the interior bottom surface of a container used in an additive fabrication device (e.g., as container 106 in FIGS. 1A-1C).

In some cases, a laminated multi-material layer that includes a first material and a barrier layer may employ an impermeable material such as fluorinated ethylene propylene (FEP) as the barrier layer. However, while FEP can provide a suitable barrier between the photopolymer and the first material, due to its impermeability it does not inhibit curing of resin at its surface which, as discussed above, is desirable because inhibition of curing can aid in separation of the container from a newly cured layer of solid photopolymer. As such, barrier layers with a higher oxygen permeability and/or oxygen selectivity than FEP are more desirable since one or both of those properties lead to inhibition of photopolymer curing, which in turn aids in separation.

According to some embodiments, a laminated multi-material layer bonded to, or otherwise part of, a container of an additive fabrication device may be substantially transparent to at least those wavelengths of actinic radiation used by the additive fabrication device in which the container is placed. For instance, an additive fabrication device that utilizes a laser beam with a wavelength of 405 nm to cure a photopolymer may utilize a container with a laminated multi-material layer in which the container and the multi-material layer include portions that are transparent to 405 nm light (although these portions may be transparent at other wavelengths as well). It should be noted that the container and/or any one or more layers of the multi-material layer may include portions that are not so transparent so long as there is a transparent window through each of the components that allow light to be projected onto regions of a photopolymer held in the container.

Following below are more detailed descriptions of various concepts related to, and embodiments of, systems and methods for separating a part from a surface during additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to the "Form 2" 3D Printer sold by Formlabs, Inc., the Assignee of the present application, and with respect to stereolithography, the techniques described herein may be equally applicable to other systems. In some embodiments, structures fabricated via one or more additive fabrication techniques as described herein may be formed from, or may comprise, a plurality of layers. For example, layer-based additive fabrication techniques may fabricate an object by forming a series of layers, which may be detectable through observation of the object, and such layers may be any size, including any thickness between 10 microns and 500 microns. In some use cases, a layer-based additive fabrication technique may fabricate an object that includes layers of different thickness.

Figure 2:
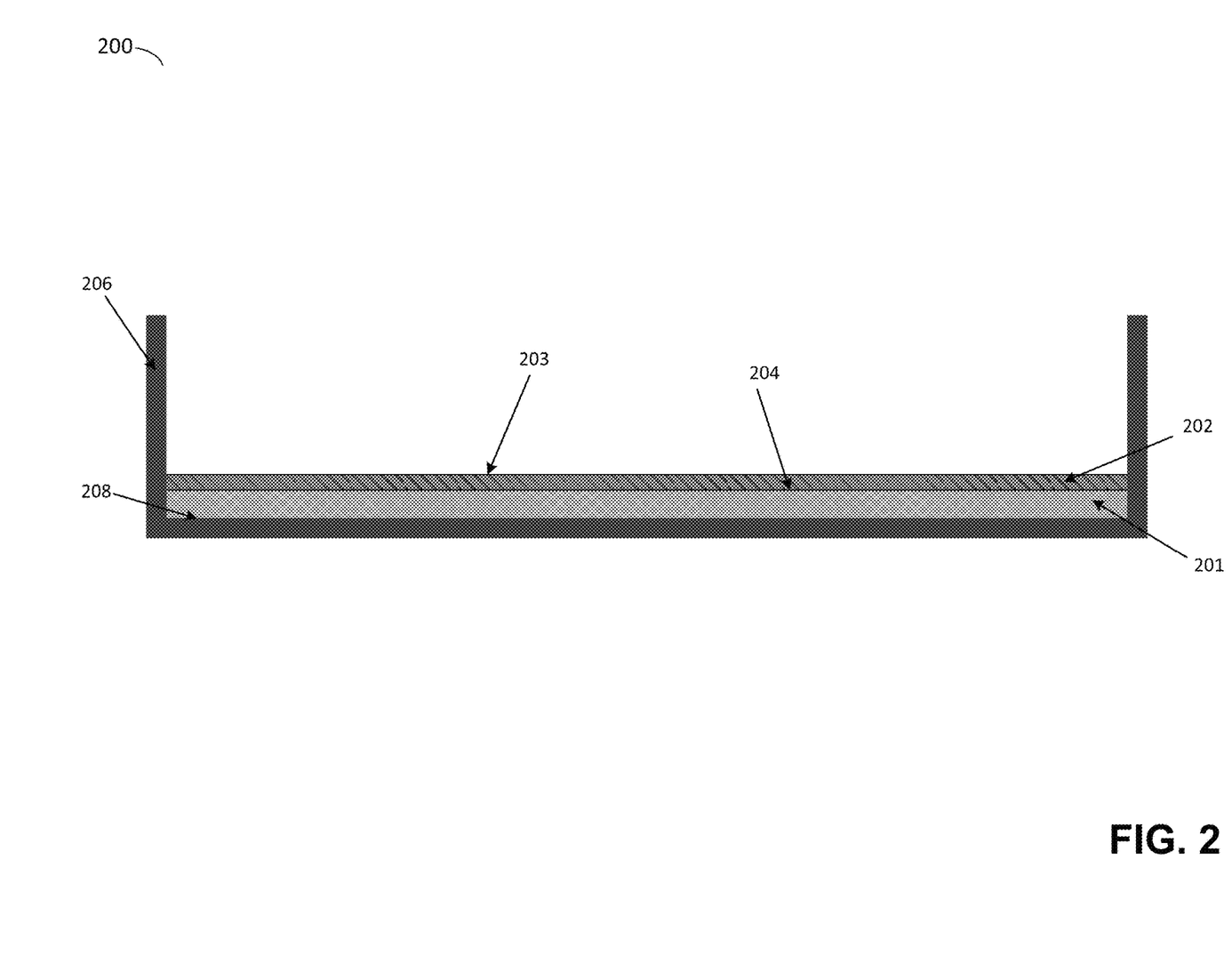
FIG. 2 depicts an illustrative container having a laminated dual-material separation layer, according to some embodiments.

FIG. 2 depicts an illustrative photopolymer container having a dual-material laminated separation layer, according to some embodiments. In the example of FIG. 2, a container 200 (which may be used, for example, as container 106 in the system of FIGS. 1A-1C) includes a body 206 to which a separation layer is applied comprising a first layer 201 and a barrier layer 202. The first material and barrier layer together comprise a laminated multi-material separation layer. As can be seen from the figure, a liquid photopolymer placed in the container 200 would contact the barrier layer 202 at its surface 203, but would not contact the first layer 201. Container body 206 may comprise acrylic, glass, and/or any material of which at least part is actinically transparent. In some embodiments, the container body 206 is formed from a rigid material.

According to some embodiments, opposing surfaces of the first layer and the barrier layer (at 204) may form an interface with one another. For example, surfaces of the first layer and the barrier layer may be bonded or otherwise adhered to one another. The surface 208 of the first layer 201 may be bonded or otherwise adhered to the surface of material forming the lower portion of container 206, and/or to an optically transparent portion of the same.

As shown in the example of FIG. 2, the surface 204 of the first layer 201 does not come into contact with a photopolymer held by the container 200, but instead is in contact only with the barrier layer 202 and material forming the boundary of the container 206. As a result, it may not be necessary for the first layer 201 to be chemically compatible with each substance within the photopolymer 206. To the extent the barrier layer 202 is relatively impermeable to a given substance, the substance within the photopolymer will not be available at or within the first layer 201 for any unwanted interactions or reactions that might occur.

In some embodiments, the first layer 201 may be described as providing a mechanical substrate layer. In such embodiments, the mechanical substrate layer may be formed of a comparatively soft solid material with elastomeric properties while the barrier layer need only be sufficiently flexible so as not to restrict the motion of the substrate layer, whilst providing a barrier between the liquid photopolymer and the mechanical substrate layer.

In certain preferred embodiments, materials from which the barrier layer 202 is formed may include, may consist substantially of, or may consist of polymethylpentene, also known as PMP. PMP may, for example, be available from Mitsui Chemicals America, Inc. under the TPX brand. The inventors have recognized that PMP materials possess several advantageous properties with respect to stereolithographic applications, including very low surface tension (less than 50 mN/m) allowing for lower separation forces, high degrees of transparency to actinic radiation, low refractive index, high gas (particularly oxygen) permeability, and excellent resistance of a broad variety of substances potentially of interest for use in liquid photopolymers.

According to some embodiments, the barrier layer 202 may have a thickness that is between 0.001" and 0.010", between 0.005" and 0.025", between 0.0025" and 0.0075", between 0.002" and 0.006", or between 0.003" and 0.005".

In some embodiments, the barrier layer is a thin film. For example, the barrier layer may be a thin film of PMP having a thickness that is between 0.003" and 0.005".

As discussed above, since oxygen permeability inhibits curing of a photopolymer, it may be preferable to select one or more materials of the barrier layer to have sufficient oxygen permeability to effect such inhibition of curing. Moreover, to make the multi-material layer compatible with a wide range of photopolymer substances, a barrier layer may be selected that is relatively impermeable to desirable substances within a photopolymer (which in at least some cases may also be incompatible with the material of the first layer). The inventors have recognized several suitable materials that exhibit these desirable properties. Hence, according to some embodiments, the barrier layer may comprise: PMP, a fluorosilicone, fluorosilicone acrylate, polymethylpentene, poly(1-trimethylsilyl-1-propyne), polytetrafluoroethylene-based or amorphous fluoroplastics, PTFE or similar materials branded Teflon or Teflon AF by Dupont, polyethylene terephthalate (PET), polyethylene terephthalate glycol-modified (PETG), or combinations thereof.

According to some embodiments, one or more materials of the first layer 201 may be selected with reduced concern for the chemical compatibility of the material(s) with substances in a liquid photopolymer held in container 200. In some embodiments, material(s) of the first layer 201 comprise polydimethylsiloxane (PDMS). For example, a PDMS material commercially available as Sylgard 184 from Dow Corning combined with Sylgard 527, also available from Dow Corning, mixed together at a 3:1 ratio has been used as a material of the first layer.

According to some embodiments, the first layer may be a cast layer of material (e.g., PDMS) poured into the bottom of a container to a depth of approximately 1-10 mm, and cured into an elastic solid. In other embodiments, materials other than PDMS may be utilized in the first layer, including materials heretofore not considered for use in separation layers due to chemical incompatibility with common liquid photopolymer materials. Various elastomeric materials with the requisite transparency to actinic radiation may thus be made suitable for use in such a separation layer. As one example, various forms of thermoplastic polyurethane (TPU) may be selected to provide acceptable degrees of elasticity and transparency. According to some embodiments, advantageous materials for the first layer may have a durometer value according to Shore Type A measurements of between approximately 10 and 50, with a range of 20-30 being the most successful.

Additionally, embodiments utilizing materials chosen to be relatively permeable to oxygen demonstrate particular advantages over embodiments where either the first layer or the barrier layer lack such properties. As discussed above, oxygen may tend to inhibit photopolymerization reactions in certain photopolymer chemistries. This inhibition effect may result in a thin layer of uncured liquid photopolymer along the surface of a separation layer, potentially improving separation performance. As an example, PDMS materials typically used to form separation layers may have comparatively high oxygen permeability on the order of 500 Barrer.

In embodiments utilizing barrier layers having comparatively low oxygen permeability, such an inhibition layer on the surface of the separation layer may not be reliably formed. As discussed above, a barrier layer formed from an FEP material may provide certain advantages with respect to its chemical resiliency, but its low oxygen permeability (typically below 5 Barrer) reduces or eliminates any oxygen inhibition effect within a liquid photopolymer near the separation layer surface. On the other hand, materials possessing comparatively higher degrees of oxygen permeability, such as PDMS, may lack sufficient chemical resiliency or provide an inadequate barrier to photopolymer compounds. Accordingly, the selection of appropriate material(s) for the barrier layer may seek to balance chemical insensitivity of the first layer material and oxygen permeability and/or selectivity. Other factors may also influence such a decision, including cost, mechanical robustness, and manufacturability.

According to some embodiments, it may be advantageous to select material(s) for the barrier layer that have the greatest oxygen permeability that are also compatible with the compounds of the liquid photopolymer. In various experiments, the inventors have found PMP, such as described above, to possess superior chemical compatibility and resilience, while providing adequate oxygen permeability on the order of 35 Barrer. Other materials with Barrer values greater than 10-20 Barrer and acceptable compatibility, however, may be also be advantageous, examples of which have been discussed above. And, as may be appreciated by those having skill in the art, inhibition materials other than oxygen may be relevant for certain photopolymer chemistries. In such cases, the preceding observations regarding the permeability characteristic with respect to oxygen are applicable for the alternative inhibition material and its permeability through the selected material.

It may further be advantageous to select one or more materials in the barrier layer to be in contact with the liquid photopolymer such that the liquid photopolymer and the selected material(s) possess a high degree of wettability with respect to each other. In particular, it may be desirable for an additive fabrication device to be able to form thin films of liquid photopolymer having a consistent thickness against the surface of the material(s) for subsequent exposure to actinic radiation. Liquid photopolymer applied to a barrier layer material that possesses a low partial wetting may tend to form beads or otherwise tend to cohere rather than to spread readily across the surface of the material into a substantially uniform thin layer. As such, FEP, Teflon AF, and other such "non-stick" surfaces, which typically comprise surfaces with low surface energies, provide poorly wetted surfaces with regards to liquid photopolymer. While this low surface energy may be advantageous for the separation of cured photopolymer, it is undesirable with regards to the formation of thin films of liquid photopolymer. The inventors have determined that PMP, in contrast, is substantially more wettable with respect to a wide range of liquid photopolymers than FEP, such that thin films of photopolymer may more reliably be formed against a first material formed of PMP, despite the fact that PMP possesses excellent separability with respect to cured photopolymer.

Laminated multi-material separation layers as described herein provide a number of additional advantages over conventional separation layers, such as the use of PDMS alone. As one example, separation layers formed of PDMS alone have a well-known tendency to degrade in a way known as "clouding" or "fogging." Without wishing to be limited to a specific theory, the inventors postulate that this form of degradation may be substantially due to the diffusion and/or absorption of photopolymer substances into the PDMS material and subsequent chemical reactions within the PDMS material. The relative impermeability of a barrier layer material, such as PMP, however, dramatically increases the effective working lifetime of photopolymer containers as described herein. This is believed to be due, in part, to the substantially reduced migration of photopolymer substances through the barrier layer material into the bulk of the separation layer. This reduction in migration and/or reduction in separation layer degradation processes further advantageously allows for substantial increases in the effective resolution and accuracy of parts formed using embodiments of the present invention. This is believed to be due in part to improved consistency in the transmission of actinic radiation through the separation layer resulting from reduced migration of photopolymer substances into the separation layer and subsequent degradation processes. In addition, the inventors have observed significantly less scattering of actinic radiation transiting through a laminated multi-material separation layer.

A container including a multi-material separation layer may be manufactured in various ways. As one example, a separation layer formed from a PMP film barrier layer and a first layer of PDMS may be formed in the following steps: first, approximately 120 ml of uncured PDMS material, such as Sylgard 184, may be introduced into a transparent acrylic container with a bottom dimension of 217 mm by 171 mm and the PDMS material allowed to cure; subsequently, 20-25 ml of additional uncured PDMS material may be introduced into the container on top of the previously cured PDMS material; a thin film of PMP film of the same size as the PDMS area may then be placed on top of the PDMS layer such that uncured PDMS is spread across the area of the PMP film and the previously cured PDMS material; and a flat applicator may be utilized in order to ensure the flush application of the PMP film to a level surface of PDMS material and the curing process completed, forming a bond between the PMP film and the PDMS and a bond between the PDMS and the acrylic container. In other instances, a container including a multi-material separation layer may be manufactured using other techniques, such as casting a barrier material onto a first material in subsequent depositions, spin coating a barrier material onto a first material, vapor or plasma deposition of a barrier material onto a first material, and/or other methods that may be suitable for the selected first and barrier materials.

In some embodiments, more than two materials may be selected in order to form the laminated separation layer. The multi-material separation layer may, for example, contain three, four or even more laminated layers. Additionally, or alternatively, one or more of the layers of the multi-material separation layer may contain an additive material that is present within the material of the layer. In some embodiments, a layer (e.g., a PMP layer) of a multi-material separation layer may incorporate materials such as talc or glass mineral fills. In general, while such additives may increase the opacity of the film material, the increase in opacity immediately proximate to the optical plane of exposure may result in only marginal decreases in accuracy or precision in the formation process. In some embodiments, the first layer and/or barrier layer may be a fiber-composite film such as disclosed in U.S. application Ser. No. 15/388,041, titled "Systems and Methods of Flexible Substrates for Additive Fabrication," filed on Dec. 22, 2016, which is incorporated by reference herein in its entirety.

In some embodiments, multiple forms of PDMS may be combined together in order to form the first layer of the multi-material separation layer. As one example, Sylgard 184 may be combined with Sylgard 527 in a three to one ratio and formed into a first layer as described above. As another example, bonds formed between a first layer and a barrier layer, or between a first layer with surfaces of a container, may be enhanced in strength by the application of a third material substantially located between the first layer and barrier layer and/or between the first layer and the surfaces of the container. In this way, potentially incompatible materials which may not otherwise adhere together strongly or at all may be successfully utilized.

In some embodiments, a first layer may have an oxygen permeability of greater than or equal to 100 Barrer, 150 Barrer, 200 Barrer, 250 Barrer or 300 Barrer. In some embodiments, the first layer may have an oxygen permeability of less than or equal to 800 Barrer, 750 Barrer, 600 Barrer or 400 Barrer. Any suitable combinations of the above-referenced ranges are also possible (e.g., an oxygen permeability of greater or equal to 300 Barrer and less than or equal to 600 Barrer, etc.). Preferably, the first layer may have an oxygen permeability that is in the range 100 Barrer to 800 Barrer, or in the range 250 Barrer to 750 Barrer, or in the range 300 Barrer to 600 Barrer, or in the range 400 Barrer to 600 Barrer.

In some embodiments, a barrier layer may have an oxygen permeability of greater than or equal to 5 Barrer, 10 Barrer, 15 Barrer, 20 Barrer or 25 Barrer. In some embodiments, the barrier layer may have an oxygen permeability of less than or equal to 100 Barrer, 80 Barrer, 60 Barrer, 40 Barrer or 35 Barrer. Any suitable combinations of the above-referenced ranges are also possible (e.g., an oxygen permeability of greater or equal to 10 Barrer and less than or equal to 40 Barrer, etc.). Preferably, the barrier layer may have an oxygen permeability that is in the range 10 Barrer to 100 Barrer, or in the range 15 Barrer to 60 Barrer, or in the range 10 Barrer to 40 Barrer, or in the range 20 Barrer to 35 Barrer.

It may further be advantageous that that barrier layer has a substantial degree of selectivity for oxygen, or an alternative inhibition material, over that of compounds in the photopolymer. In particular, materials such as PMP polymer films may form membranes with a desired permeability to different compounds. The degree of permeability of such a membrane may depend at least in part upon the particular compound permeating the material. With regards to materials that are relatively impermeable, variation due to molecular size of the compound may be the dominant factor with regard to any limited permeability. For more permeable materials, however, that permeability may vary based in part on other chemical properties of a compound. To the extent that a given material is more permeable to a first compound than to a second compound, the material is said to have a "selectivity" for the first compound versus the second compound. Such selectivity may be expressed in terms of a ratio between the measurement of permeability for the first compound over the second compound wherein the ratio is greater than 1.0. To use the above examples, since FEP is relatively equally impermeable to all compounds, the selectivity of a given material versus a different material for FEP will likely be close to 1. In contrast, PMP may have a selectivity for oxygen versus photopolymer compounds that is greater (or much greater) than 1.

According to some embodiments, a separation layer may comprise a permeable material that has a higher selectivity for oxygen, or another relevant cure inhibitor, than for compounds in the photopolymer resin. Such a separation layer may advantageously allow for inhibiting compounds (e.g., oxygen) to diffuse into the photopolymer while preventing compounds in the photopolymer resin from permeating into or through the separation layer. For example, a barrier layer may have a high selectivity for oxygen versus one or more compounds of the photopolymer. Such a selectivity may be between 1 and 10, or between 2 and 20, or at least 5, or at least 10, or at least 20, or at least 50.

Figure 3A:
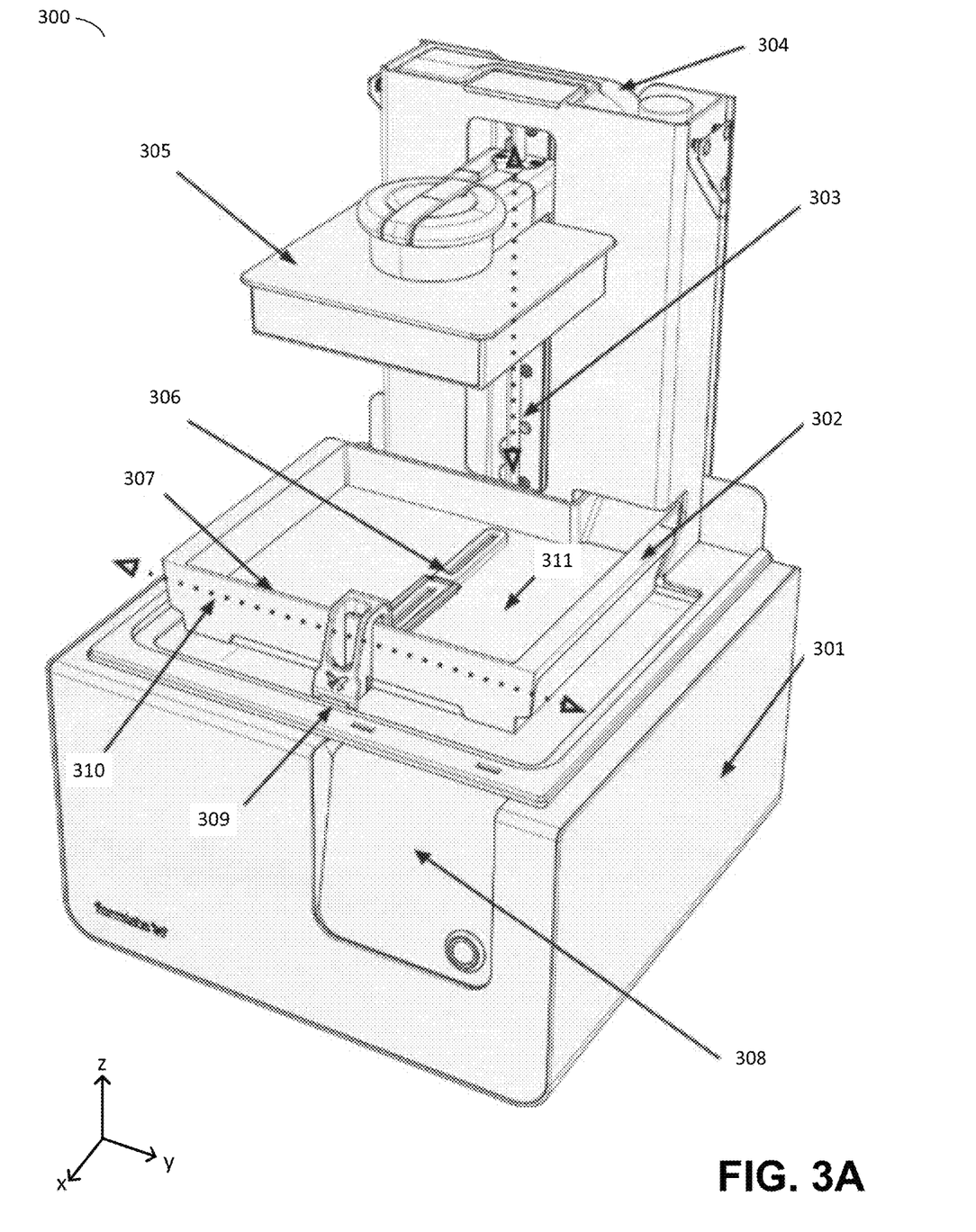
FIGS. 3A-B depict an illustrative additive fabrication device, according to some embodiments.
Figure 3B:
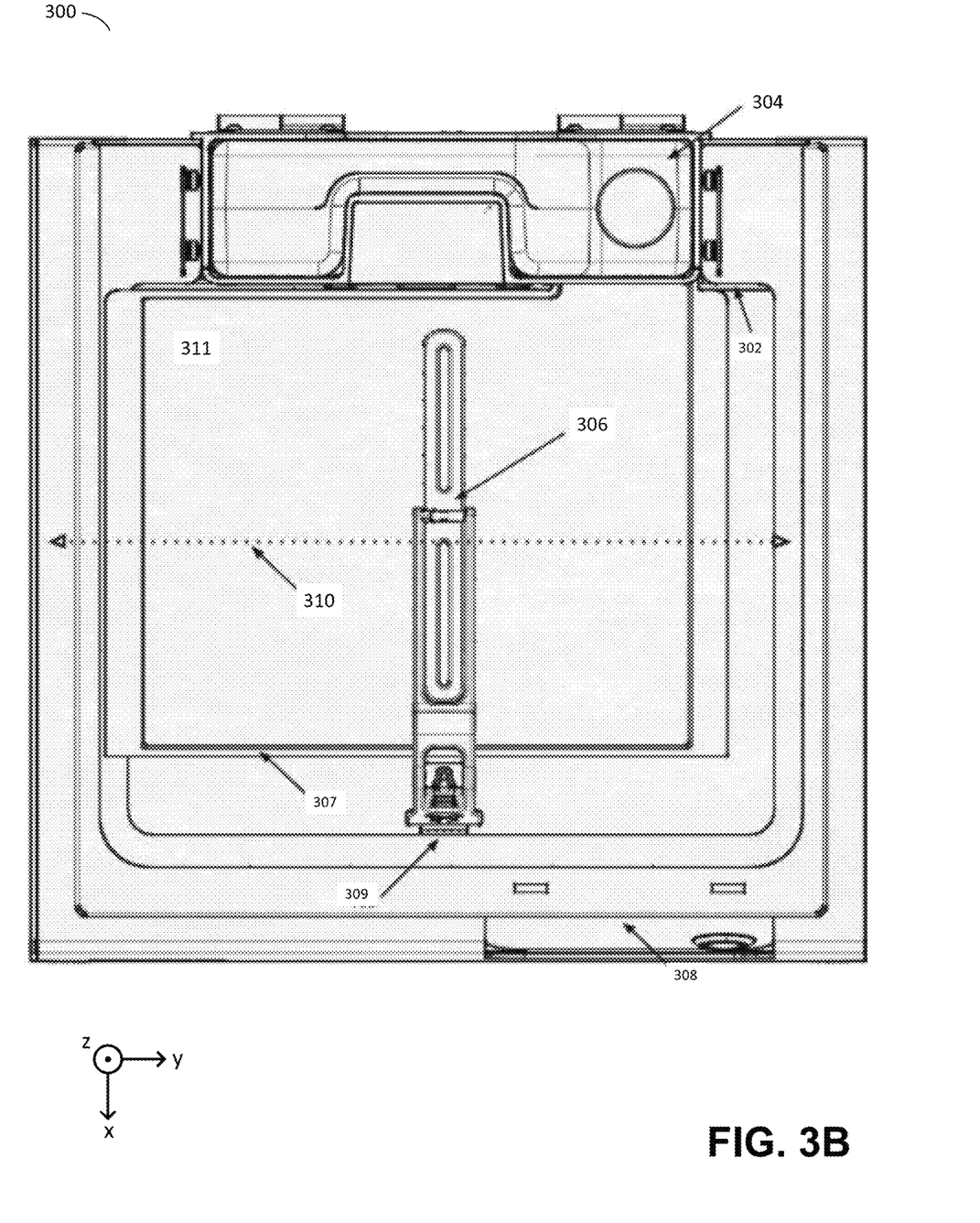

Another illustrative additive fabrication device in which a container having a laminated multi-material separation layer disposed therein may be utilized is shown in FIGS. 3A-B. For example, container 200 may be employed in system 300 of FIGS. 3A-3B. Illustrative stereolithographic printer 300 comprises a support base 301, a display and control panel 308, and a reservoir and dispensing system 304 for storage and dispensing of photopolymer resin. The support base 301 may contain various mechanical, optical, electrical, and electronic components that may be operable to fabricate objects using the system.

During operation, photopolymer resin may be dispensed from the dispensing system 304 into container 302. Container 302 may comprise a laminated multi-material separation layer, such as that within container 200 shown in FIG. 2, for example.

Build platform 305 may be positioned along a vertical axis 303 (oriented along the z-axis direction as shown in FIGS. 3A-B) such that the bottom facing layer (lowest z-axis position) of an object being fabricated, or the bottom facing layer of build platform 305 itself, is a desired distance along the z-axis from the bottom 311 of container 302. The desired distance may be selected based on a desired thickness of a layer of solid material to be produced on the build platform or onto a previously formed layer of the object being fabricated.

In the example of FIGS. 3A-B, the bottom 311 of container 302 may be transparent to actinic radiation that is generated by a radiation source (not shown) located within the support base 301, such that liquid photopolymer resin located between the bottom 311 of container 302 and the bottom facing portion of build platform 305 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the bottom facing portion of build platform 305 or to an object being fabricated thereon. FIGS. 3A-B represent a configuration of stereolithographic printer 301 prior to formation of any layers of an object on build platform 305, and for clarity also omits any liquid photopolymer resin from being shown within the depicted container 302.

Following the curing of a layer of material, build platform 305 may be moved along the vertical axis of motion 303 in order to reposition the build platform 305 for the formation of a new layer and/or to impose separation forces upon any bond with the bottom 311 of container 302. In addition, container 302 is mounted onto the support base such that the stereolithographic printer 301 may move the container along horizontal axis of motion 310, the motion thereby advantageously introducing additional separation forces in at least some cases. A wiper 306 is additionally provided, capable of motion along the horizontal axis of motion 310 and which may be removably or otherwise mounted onto the support base at 309.

Reference is made herein to materials being "transparent." It will be appreciated that transparency of a container and transparency of a multi-material separation layer disposed thereon is relevant insomuch as actinic radiation is to be transmitted to a photopolymer within the container. As such, "transparency" refers to transparency to actinic radiation, which may, or may not, mean transparency to all visible light. In some embodiments, actinic radiation may comprise radiation in the visible spectrum—accordingly, a material transparent to such actinic radiation will be transparent to at least one wavelength of visible light.

Moreover, elements exhibiting various degrees of gas permeability, particularly oxygen permeability are discussed herein. The permeability values provided above may be the result of any suitable testing protocol for gas permeability, including the differential pressure method (including, but not limited to, the vacuum method) and the equal pressure method. For example, the permeability value provided above may be the result of the ISO 15105 standardized testing protocol for measuring the gas permeability of materials.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A container for use in an additive fabrication device configured to fabricate parts by curing a liquid photopolymer to form layers of cured photopolymer, the container comprising:
    an open-topped vessel having an interior bottom surface, at least a region of the interior bottom surface being transparent to at least one wavelength of actinic radiation; and
    a laminated multi-material layer bonded to the interior bottom surface of the vessel and configured to facilitate separation of the cured photopolymer from an exposed surface of the laminated multi-material layer, the laminated multi-material layer comprising:
        a first material layer bonded to at least a portion of the region of the interior bottom surface, wherein the first material layer comprises polydimethylsiloxane (PDMS);
        a second material layer having an oxygen permeability of at least 10 Barrer and no greater than 60 Barrer, and forming the exposed surface of the container; and a third material layer between the first and second material layers, wherein the third material layer is bonded to at least a portion of the first material layer and is bonded to at least a portion of the second material layer.

2. The container of claim 1, wherein the second material layer comprises polymethylpentene (PMP).

3. The container of claim 1, wherein the second material layer has a higher selectivity for oxygen than for any compound of the liquid photopolymer.

4. The container of claim 1, wherein the first material layer has an oxygen permeability of at least 200 Barrer.

5. The container of claim 1, wherein the second material layer has an oxygen permeability between 20 Barrer and 50 Barrer.

6. The container of claim 1, further comprising a fourth material layer between the first material layer and the interior bottom surface, and wherein the first material layer is bonded to the interior bottom surface by being bonded to the fourth material layer, which is bonded to the interior bottom surface.

7. An additive fabrication device configured to fabricate parts by curing a liquid photopolymer to form layers of cured photopolymer, the additive fabrication device comprising:
   at least one source of actinic radiation configured to produce actinic radiation that includes radiation of a first wavelength;
   a photopolymer container, comprising:
      an open-topped vessel having an interior bottom surface, at least a region of the interior bottom surface being transparent to the first wavelength of the actinic radiation; and
      a laminated multi-material layer bonded to the interior bottom surface of the vessel and configured to facilitate separation of the cured photopolymer from an exposed surface of the laminated multi-material layer, the laminated multi-material layer comprising:
         a first material layer bonded to at least a portion of the transparent region of the interior bottom surface, wherein the first material layer comprises polydimethylsiloxane (PDMS);
         a second material layer having an oxygen permeability of at least 10 Barrer and no greater than 60 Barrer, and forming the exposed surface of the container; and
         a third material layer between the first and second material layers, wherein the third material layer is bonded to at least a portion of the first material layer and is bonded to at least a portion of the second material layer.

8. The additive fabrication device of claim 7, wherein the second material layer comprises polymethylpentene (PMP).

9. The additive fabrication device of claim 7, wherein the second material layer has a higher selectivity for oxygen than for any compound of the liquid photopolymer.

10. The additive fabrication device of claim 7, wherein the first material layer has an oxygen permeability of at least 200 Barrer.

11. The additive fabrication device of claim 7, wherein the second material layer has an oxygen permeability between 20 Barrer and 50 Barrer.

12. The additive fabrication device of claim 7, wherein the first material layer has a thickness between 1 mm and 10 mm.

13. The additive fabrication device of claim 7, wherein the second material layer has a thickness between 0.001" and 0.01".

14. The additive fabrication device of claim 7, further comprising a fourth material layer between the first material layer and the interior bottom surface, and wherein the first material layer is bonded to the interior bottom surface by being bonded to the fourth material layer, which is bonded to the interior bottom surface.

15. The additive fabrication device of claim 7, wherein the first material layer and/or the second material layer is a fiber composite film.

16. The additive fabrication device of claim 7, wherein the first material layer and the second material layer are transparent to the first wavelength of the actinic radiation.

* * * * *